(12) United States Patent
Foster et al.

(10) Patent No.: US 6,560,561 B1
(45) Date of Patent: May 6, 2003

(54) INTEGRATED PAYLOAD SENSOR

(75) Inventors: Steven Foster, Rochester Hills, MI (US); Roch Tolinski, Howell, MI (US); Holly Giangrande, Troy, MI (US); Charlie Hopson, Lebanon, TN (US); Nicholas Kalargeros, Coventry (GB); Carmelo Mondello, Frankfurt (DE); Rainer Grimm, Frankfurt (DE); Laurent Arquevaux, Sully sur Loire (FR)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/548,764

(22) Filed: Apr. 13, 2000

(51) Int. Cl.[7] ............................................... G01G 19/08
(52) U.S. Cl. ..................... 702/174; 701/50; 171/141
(58) Field of Search ............................ 702/174; 701/35, 701/50; 177/141, 136

(56) References Cited

U.S. PATENT DOCUMENTS

| | | | |
|---|---|---|---|
| 4,630,227 A | 12/1986 | Hagenbuch | 702/174 |
| 4,839,835 A | 6/1989 | Hagenbuch | 702/174 |
| 5,315,899 A | 5/1994 | Mochizuki | 477/119 |
| 5,659,470 A | 8/1997 | Goska et al. | 701/35 |

*Primary Examiner*—Kamini Shah
(74) *Attorney, Agent, or Firm*—Carlson, Gaskey & Olds

(57) ABSTRACT

A system for measuring payload is integrated into the cargo carrying bed of a vehicle. The vehicle bed is formed from a plastic material and includes a body member that is supported on a vehicle frame. At least one sensor assembly is molded within the body member. The sensor is positioned over the vehicle frame and generates a weight signal representative of weight of the payload supported on the body member. A central processor receives the weight signal and transmits the weight signal to a vehicle driver. The weight signal can be used to activate a warning device if the payload exceeds a predetermined limit.

19 Claims, 1 Drawing Sheet

INTEGRATED PAYLOAD SENSOR

BACKGROUND OF THE INVENTION

This invention relates to a sensor that is integrated into a vehicle body member to measure payload.

Pick-up trucks and sport utility vehicles typically have a rear cargo area for transporting large items. These vehicles have maximum payload ratings that represent the maximum cargo weight that the vehicle can carry. Thus, it is important to know the weight of the payload because overloading can result in premature component wear and increased maintenance costs.

Often it is difficult to tell how much weight has been loaded onto a vehicle. Vehicles carry various types of cargo or payload in varying amounts. In order to avoid overload, it is important for a vehicle operator to know the payload weight at all times during the operation of the vehicle.

The most common method used for monitoring the payload weight is a scale. The vehicle is driven onto the scale and the weight of the vehicle plus the payload is measured while the vehicle is stationary. There are several drawbacks with this method. First, the scales are expensive and require continual maintenance to ensure proper calibration. Second, use of scales can be time consuming and inconvenient, as there is limited access to such scales.

Another method for monitoring the payload of a vehicle uses a force sensor, such as a load cell or pressure transducer, that is mounted onto an axle. This method is time consuming and expensive to install because it requires modifications the axle. The system components are also exposed to the external environment and can become damaged.

Thus, it is desirable to have an inexpensive system for determining the weight of a vehicle payload that continually monitors payload and which is easily installed, maintained. The system should be well protected, provide accurate measurements, and be easily incorporated into a pick-up truck or sport utility vehicle.

SUMMARY OF THE INVENTION

In a disclosed embodiment of this invention, a system for measuring a vehicle payload includes a body member supported on a vehicle frame and at least one sensor assembly mounted within the body member. The sensor assembly is used to generate a weight signal representative of weight of a payload supported on the body member. Preferably, the body member is formed from a plastic material and the sensor assembly is molded within the plastic material. The sensor is positioned over the vehicle frame such that the weight of the payload supported on the body member is directed through the frame and is easily measured by the sensor assembly.

In a preferred embodiment, the vehicle frame includes a first member for supporting one side of the body member and a second member, laterally spaced from the first member, for supporting an opposite side of the body member. A first sensor is molded within the body member and positioned over the first frame member and a second sensor is molded within the body member and positioned over the second frame member. The first sensor generates a first signal representative of a portion of the payload supported on the first frame member and the second sensor generates a second signal representative of a portion of the payload supported on the second frame member. A central processor receives the signals and transmits a weight indication signal to a driver. A warning device is activated if the payload weight exceeds a predetermined limit.

The method of assembling the payload measuring system into a vehicle includes the following steps. A cargo bed for transporting a vehicle payload is provided with a generally planar bottom member. At least one sensor is molded into the bottom member and the body member is mounted on a vehicle frame.

The subject system provides a simplified mechanism for measuring a vehicle payload that includes sensors that are easily integrated into a vehicle support member. The sensors are fixed relative to the support member to provide accurate measurements and are well protected from the possibility of external damage.

These and other features of the present invention can be best understood from the following specification and drawings, the following of which is a brief description.

DETAILED DESCRIPTION OF A PREFERRED EMBODIMENT

Figure 1:
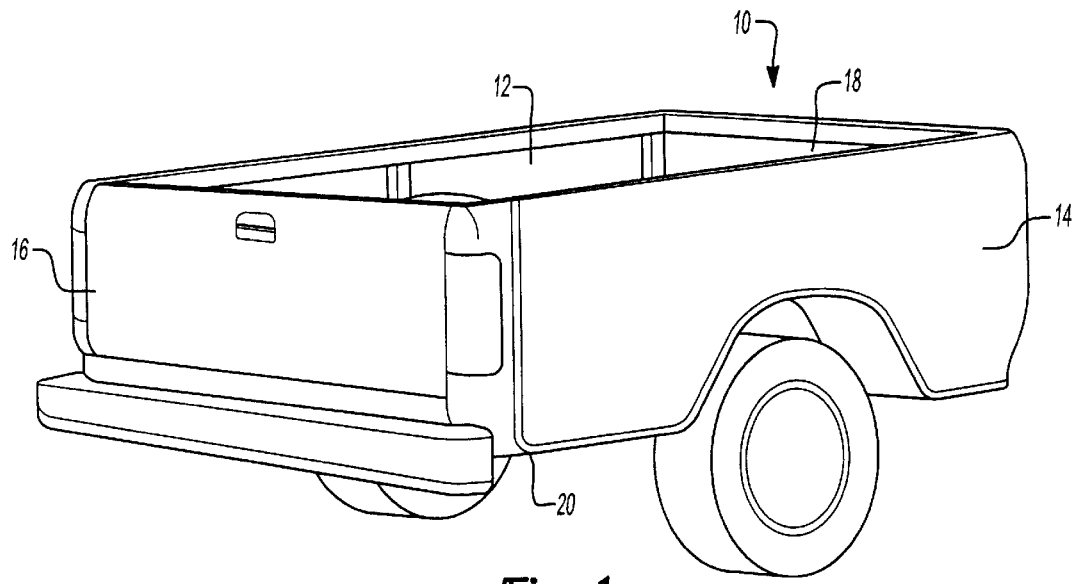
FIG. 1 is a perspective view a cargo carrying area for a vehicle.

A vehicle body is generally shown at 10 in FIG. 1. The vehicle is preferably a pick-up truck or sport utility vehicle, however the invention can be easily incorporated into other types of vehicles. The vehicle body 10 includes a pick-up truck bed having a driver side fender 12, a passenger side fender 14, a tailgate 16, and a front connecting member 18. The tailgate 16 and front connecting member 18 connect opposing ends of the driver 12 and passenger 14 side fenders to form a four-sided box. The box is attached to a bottom body member 20 to form a truck bed.

Figure 2:
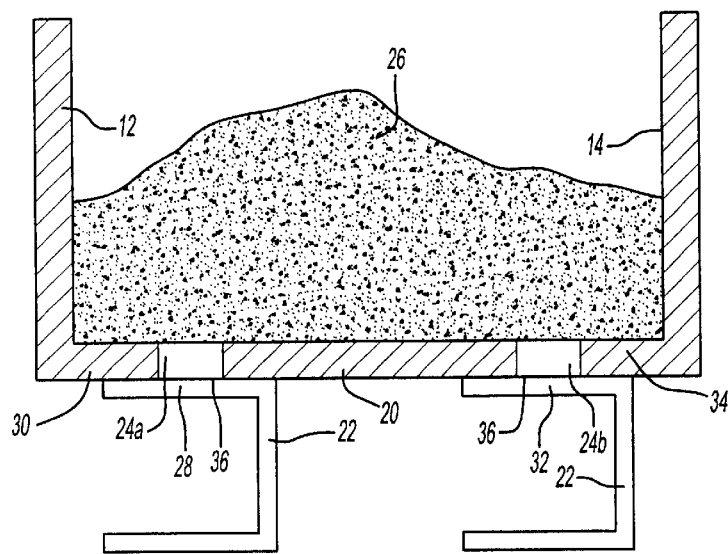
FIG. 2 is a cross-sectional schematic view of sensors as installed within the cargo carrying area.

The truck bed is mounted to a vehicle chassis, unibody member, or frame member 22, shown in FIG. 2. It should be understood that the bed can be made from a single piece of material that is folded together, can be made from individual pieces that are attached together, or a combination thereof. Preferably, the truck bed is a single piece formed from a plastic material with the finders 12, 14 and front connecting members 18 being folded into place. Any type of plastic material known in the art can be used. The tailgate 16 is preferably a separate piece that can be pivoted between open and closed position.

A system for measuring a vehicle payload is integrated into the truck bed. As shown in FIG. 2, the bottom body member 20 is supported on the vehicle frame 22. At least one sensor assembly 24 is mounted within the body member 20. Any type of sensor assembly 24 known in the art can be used, including strain gages, accelerometers, or potentiometers, for example. The sensor assembly 24 generates a weight signal representative of weight of a payload 26 supported on the body member 20.

In the preferred embodiment, the vehicle frame 22 includes a first member 28 that is connected to one side 30 of the body member 20 and a second member 32 laterally spaced from the first member 28 for supporting an opposite side 34 of the body member 20. Preferably, the sensor assembly 24 is comprised of a first sensor 24a mounted within the body member 20 and positioned over the first frame member 28 and a second sensor 24b mounted within the body member 20 and positioned over the second frame member 32. Thus, each sensor 24a, 24b is positioned within the body member 20 directly over the vehicle frame 22.

The payload 26 is supported on the bottom body member 20 and the weight force generated by the payload 26 is transferred directly to the vehicle frame 22 at a interface 36 of the frame 22 to the body member 20. Ideally, the sensors 24a, 24b are placed at this interface 36 to provide the most accurate measurements.

As discussed above, the body member 20 is formed from a plastic material with the first 24a and second 24b sensors being molded within the material. While two (2) sensors 24a, 24b are preferred, it should be understood that additional sensors 24 could also be molded into the body member 20.

Figure 3:
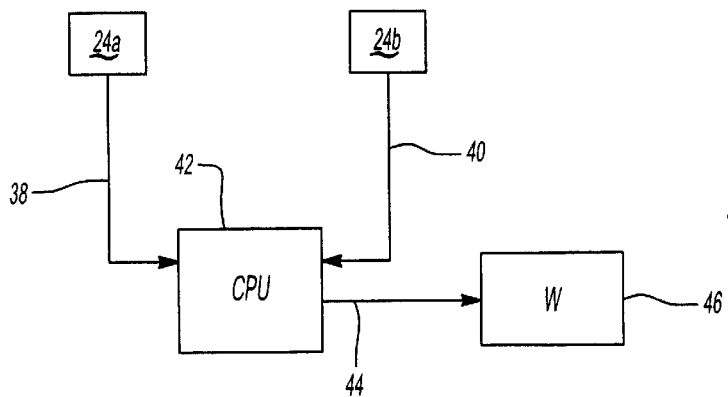
FIG. 3 is a schematic view of a control system utilized by the payload measuring sensors.

As shown in FIG. 3, the first sensor 24a generates a first signal 38 representative of a portion of the payload 26 supported on the first frame member 28 and the second sensor 24b generates a second signal 40 representative of a portion of the payload 26 supported on the second frame member 32. A central processor unit (CPU) 42 receives the signals 38, 40 and transmits a weight signal 44 to a driver or occupant. Any type of computer or electronic control unit known in the art can be used. The system can also include a visual or audible warning device 46 that is activated when the weight signal 44 exceeds a predetermined limit. The sensors 24a, 24b are electrically connected to the CPU 42 by standard electrical configurations known in the art.

The CPU 42 can also be programmed to compare the first 38 and second 40 signals to determine payload distribution on the body member 20. The warning device 46 can be activated if the first signal 38 exceeds the second signal 40 by a predetermined amount. Thus, the system can determine whether the payload has been improperly distributed within the truck bed. If too much the payload 26 is positioned on one side of the bed, the load can become unbalanced, which can affect vehicle stability.

The method of assembling a vehicle payload measuring system includes the following steps. A cargo bed for transporting a vehicle payload 26 is provided with a generally planar bottom member 20. The bottom member is formed from a plastic material as is known in the art and At least one sensor assembly 24 is molded into the bottom member 20. The body member 20 is mounted on the vehicle frame 22. The sensor assembly is positioned over the vehicle frame 22 to be responsive to the payload interface 36 between the body member 20 and the frame 22.

The unique payload sensing system provides sensors that are easily integrated into a truck body by molding the sensors into the body material. Additional steps of installing a payload sensing system after vehicle assembly are eliminated and the sensors are well protected from the external environment.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A system for measuring a vehicle payload comprising:
    a body member formed from a plastic material and supported on a vehicle frame; and
    at least one sensor assembly molded within said body member for generating a weight signal representative of weight of a payload supported on said body member.

2. A system as recited in claim 1 wherein said sensor assembly is positioned within said body member directly over said vehicle frame.

3. A system as recited in claim 1 including a central processor for receiving said weight signal and transmitting said weight signal to a driver.

4. A system as recited in claim 3 including a warning device that is activated when said weight signal exceeds a predetermined limit.

5. A system as recited in claim 1 wherein said vehicle frame includes a first member for supporting one side of said body member and a second member laterally spaced from said first member for supporting an opposite side of said body member and wherein said at least one sensor assembly is comprised of a first sensor mounted within said body member and positioned over said first frame member and a second sensor mounted within said body member and positioned over said second frame member.

6. A system as recited claim 5 wherein said body member is formed from a plastic material with said first and second sensors being molded within said material.

7. A system for measuring a vehicle payload comprising:
    a plastic body member supported on a vehicle frame;
    at least one sensor assembly molded within said body member for generating a weight signal representative of weight of a payload supported on said body member; and
    a central processor for receiving said weight signal and transmitting said weight signal to a vehicle driver.

8. A system as recited claim 7 wherein said sensor assembly is positioned over said vehicle frame.

9. A system as recited claim 8 wherein said vehicle frame includes a first member for supporting one side of said body member and a second member laterally spaced from said first member for supporting an opposite side of said body member and wherein said at least one sensor assembly is comprised of a first sensor molded within said body member and positioned over said first frame member and a second sensor molded within said body member and positioned over said second frame member.

10. A system as recited claim 9 including a warning device that is activated when said weight signal exceeds a predetermined limit.

11. A system as recited in claim 9 wherein said first sensor generates a first signal representative of a portion of the payload supported on said first frame member and said second sensor generates a second signal representative of a portion of the payload supported on said second frame member.

12. A system as recited claim 11 wherein said processor compares said first and second signals to determine payload distribution on said body member.

13. A system as recited in claim 12 including a warning device that is activated if said first signal exceeds said second signal by a predetermined amount.

14. A system as recited in claim 9 including a first fender, a second fender laterally spaced from said first fender, a rear body portion interconnecting said first and second fenders at one end, a front body portion interconnecting said first and second fenders at an opposite end, and said body member formed as a substantially planar bottom portion attached to said first fender, said second fender, said rear body portion, and said front body portion to form a bed.

15. A method for producing a vehicle payload measuring system comprising the steps of:
    providing a cargo bed for transporting a vehicle payload wherein the bed has a generally planar bottom member formed from a plastic material;
    molding at least one sensor into the bottom member; and
    mounting The bottom member on a vehicle frame.

16. A method as recited in claim 15 including the step of positioning the sensor over the vehicle frame.

17. A system as recited in claim 1 wherein said body member comprises a truck bed.

18. A system as recited in claim 17 wherein said sensor assembly is at least partially encased within a bottom portion of said truck bed.

19. A system as recited 7 wherein said body member comprises a truck bed and said sensor assembly is at least partially enclosed within a bottom portion of said truck bed.

* * * * *